United States Patent
Yun (10) Patent No.: US 7,054,947 B2
(45) Date of Patent: May 30, 2006

(54) AUTO-NEGOTIATION METHOD FOR HIGH SPEED LINK IN GIGABIT ETHERNET USING 1000 BASE-T STANDARD AND APPARATUS THEREOF

(75) Inventor: Yeou-sun Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 09/945,605

(22) Filed: Sep. 4, 2001

(65) Prior Publication Data

US 2002/0133631 A1    Sep. 19, 2002

(30) Foreign Application Priority Data

Jan. 15, 2001    (KR) .................. 2001-2169

(51) Int. Cl.
    *G06F 15/16* (2006.01)
(52) U.S. Cl. ............ 709/233; 709/251; 709/208; 709/230; 370/348
(58) Field of Classification Search ........ 709/251, 709/208, 233; 370/438, 463, 296, 348; 717/173; 375/348

See application file for complete search history.

(56) References Cited

U.S. PATENT DOCUMENTS

| | | | | |
|---|---|---|---|---|
| 5,883,894 A | * | 3/1999 | Patel et al. ............... | 370/438 |
| 6,169,729 B1 | * | 1/2001 | Feuerstraeter .............. | 370/296 |
| 6,215,816 B1 | * | 4/2001 | Gillespie et al. ........... | 375/219 |
| 6,631,520 B1 | * | 10/2003 | Theron et al. ............. | 717/173 |
| 6,795,450 B1 | * | 9/2004 | Mills et al. ............... | 370/463 |
| 2002/0025780 A1 | * | 2/2002 | Jakobsson et al. .......... | 455/41 |
| 2002/0027881 A1 | * | 3/2002 | Castellano et al. ......... | 370/252 |
| 2004/0156461 A1 | * | 8/2004 | Agazzi et al. ............. | 375/350 |
| 2005/0036576 A1 | * | 2/2005 | Agazzi et al. ............. | 375/348 |

FOREIGN PATENT DOCUMENTS

FR    EP0963079 A2 *    8/1999
KR    P19990043717        6/1999

OTHER PUBLICATIONS

Japanese Patent Abstract—Publication No. hei 12-349854: Publication Date Dec. 15, 2000.

* cited by examiner

*Primary Examiner*—Rupal Dharia
*Assistant Examiner*—Djenane Bayard
(74) *Attorney, Agent, or Firm*—F. Chau & Associates, LLC (57) ABSTRACT

An auto-negotiation (AN) method for establishing a high speed link between first and second transmitting devices in a gigabit Ethernet using the 1000 Base-t standard includes transmitting and receiving a base page indicating a transmission capability between the first and second transmitting devices. A message page is transmitted and received that indicates a 1000 Mbps transmission capability between the first and second transmitting devices and a specific state. A first unformatted page is transmitted and received that indicates transmitting speeds and modes, and port types of the first and second transmitting devices. A null page is transmitted and received after the first unformatted page, upon determining a master and slave from among the first and second transmitting devices based upon the first unformatted page. A high speed link is established between the first and second transmitting devices and the AN method is terminated.

17 Claims, 7 Drawing Sheets

| D0 | D1 | D2 | D3 | D4 | D5 | D6 | D7 | D8 | D9 | D10 | D11 | D12 | D13 | D14 | D15 |
|----|----|----|----|----|----|----|----|----|----|-----|-----|-----|-----|-----|-----|
| S0 | S1 | S2 | S3 | S4 | A0 | A1 | A2 | A3 | A4 | A5  | A6  | A7  | RF  | ACK | NPB |

(b)

| D0 | D1 | D2 | D3 | D4 | D5 | D6 | D7 | D8 | D9 | D10 | D11 | D12  | D13 | D14 | D15 |
|----|----|----|----|----|----|----|----|----|----|-----|-----|------|-----|-----|-----|
| M0 | M1 | M2 | M3 | M4 | M5 | M6 | M7 | M8 | M9 | M10 | T   | ACK2 | MPB | ACK | NPB |

(c)

| D0 | D1 | D2 | D3 | D4 | D5 | D6 | D7 | D8 | D9 | D10 | D11 | D12  | D13 | D14 | D15 |
|----|----|----|----|----|----|----|----|----|----|-----|-----|------|-----|-----|-----|
| U0 | U1 | U2 | U3 | U4 | U5 | U6 | U7 | U8 | U9 | U10 | T   | ACK2 | MPB | ACK | NPB |

| D0 | D1 | D2 | D3 | D4 | D5 | D6 | D7 | D8 | D9 | D10 | D11 | D12 | D13 | D14 | D15 |
|----|----|----|----|----|----|----|----|----|----|-----|-----|-----|-----|-----|-----|
| 0  | 0  | 0  | 1  | 0  | 0  | 0  | 0  | 0  | 0  | 0   | T   | ACK2| 1   | ACK | 1   |

(b)

| D0 | D1 | D2 | D3 | D4 | D5 | D6 | D7 | D8 | D9 | D10 | D11 | D12 | D13 | D14 | D15 |
|----|----|----|----|----|----|----|----|----|----|-----|-----|-----|-----|-----|-----|
| 0  | 0  | 0  | 0  | 1  | 0  | 0  | 0  | 0  | 0  | 0   | T   | ACK2| 1   | ACK | 1   |

FIG. 7

AUTO-NEGOTIATION METHOD FOR HIGH SPEED LINK IN GIGABIT ETHERNET USING 1000 BASE-T STANDARD AND APPARATUS THEREOF

BACKGROUND OF THE INVENTION

1. Technical Field

The present invention relates to high speed data links and Ethernets and, more particularly, to an auto-negotiation (AN) method for establishing a high speed link in a gigabit Ethernet using the 1000 Base-T standard and an apparatus thereof.

2. Description of the Related Art

In general, the Ethernet is a model of a network that is used in a communications network, such as a local area network (LAN) installed in a specific area. In other words, the Ethernet is a coaxial cable network adopted by the Institution of Electrical and Electronic Engineers (IEEE). As the speed of Ethernet increases, gigabit Ethernet is beginning to be widely used. Gigabit Ethernet is defined in the IEEE 802.3 standard. More particularly, the 1000 Base-T standard is one of the standard protocols using coaxial cable and defines the IEEE 802.3ab model. Among the functions of gigabit Ethernet, an auto-negotiation (hereinafter referred to as "AN") function is necessary to link transmitting devices, i.e., a remote station and a local station. In other words, the AN function determines the transmission speed and operating mode between the remote and local stations before linking them, and lets them communicate with each other based on the determined results. The local station could determine the transmission speed and operating mode with a parallel detection function in 10/100 Mbps Ethernet even though it does not have the AN function. Here, the parallel detection function is that in which a device not using the AN function detects a normal transmission mode and converts a transmission mode to a normal mode automatically when a device not using the AN function and another device using the AN function are linked with each other. However, in the case of the 1000 Mbps Ethernet, the AN function necessarily determines the transmission speed and the operating mode between transmitting devices. Also, master and slave functions are included in gigabit Ethernet. In other words, one of the linked devices serves as the master and the other serves as the slave. Thus, gigabit Ethernet requires the AN function.

Figure 1:
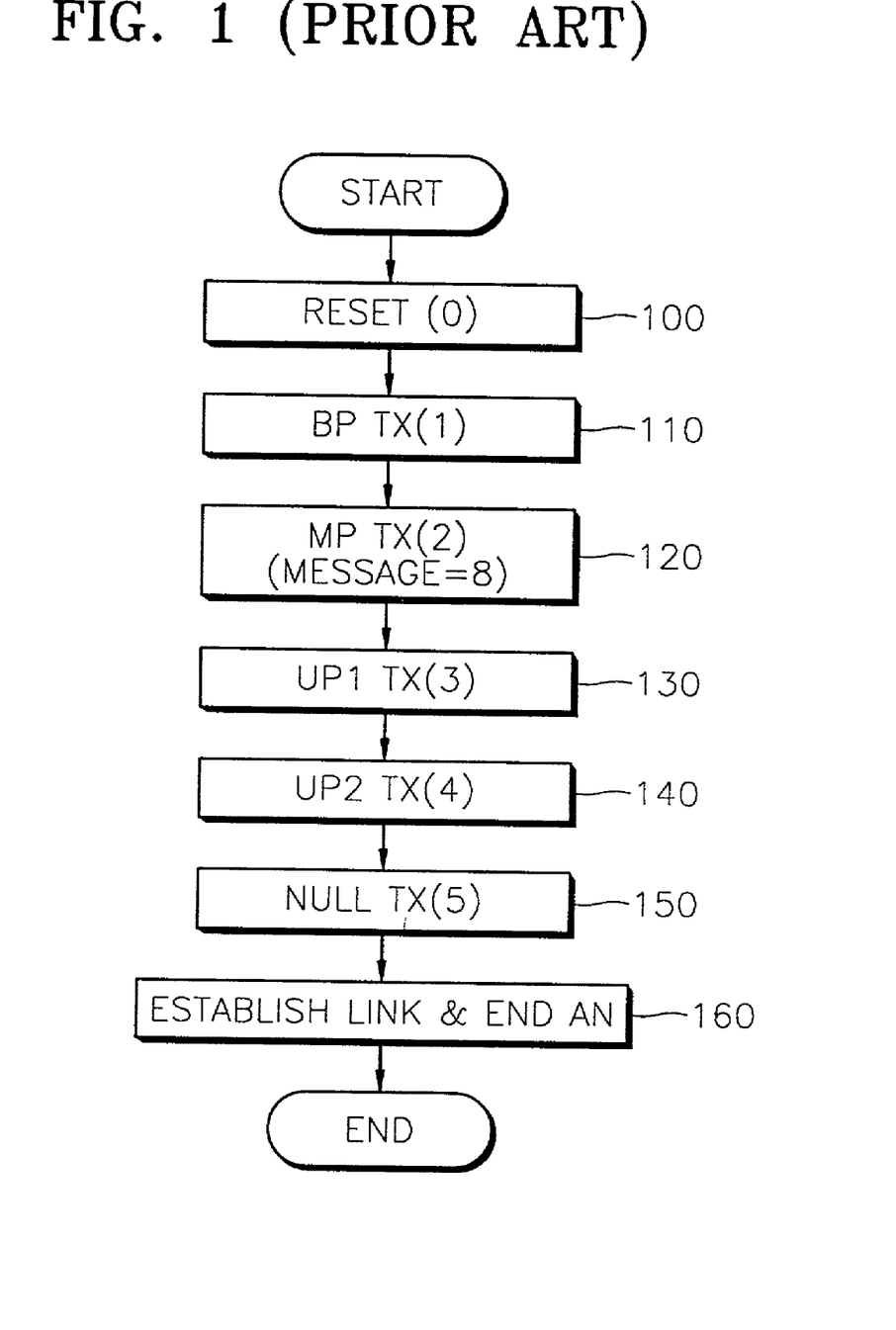
FIG. 1 is a flow diagram illustrating the transmission process of a conventional AN method in a high speed Ethernet using the 1000 Base-T standard.

FIG. 1 is a flow diagram illustrating the transmission process of a conventional AN method in high speed Ethernet using the 1000 Base-T standard. Referring to FIG. 1, five page transmission steps are performed between transmitting devices to carry out the conventional AN function under the 1000 Base-T standard. After an initial reset (step 100), a transmitting device transmits a base page (hereinafter referred to as "BP"), which denotes a transmission standard and a basic transmission speed (step 110). Next, a message page (hereinafter referred to as "MP") is transmitted to indicate the possibility of transmission at a speed of 1000 Mbps and two unformatted message pages (hereinafter referred to as "UP") to be transmitted (step 120). Here, the message expressed in the MP generally shows a predetermined number, e.g., "8". In other words, the message "8" shows that two UPs will be transmitted later. The transmitting device transmits first and second unformatted message pages UP1 and UP2 (steps 130 and 140) and then a null page (hereinafter referred to as "NP") (step 150). Here, the UP1 includes transmission speed and mode, device type, and duplex mode. The UP2 includes random seed values. Through these steps, the link is established between two transmitting devices and the AN ends (step 160).

Figure 2:
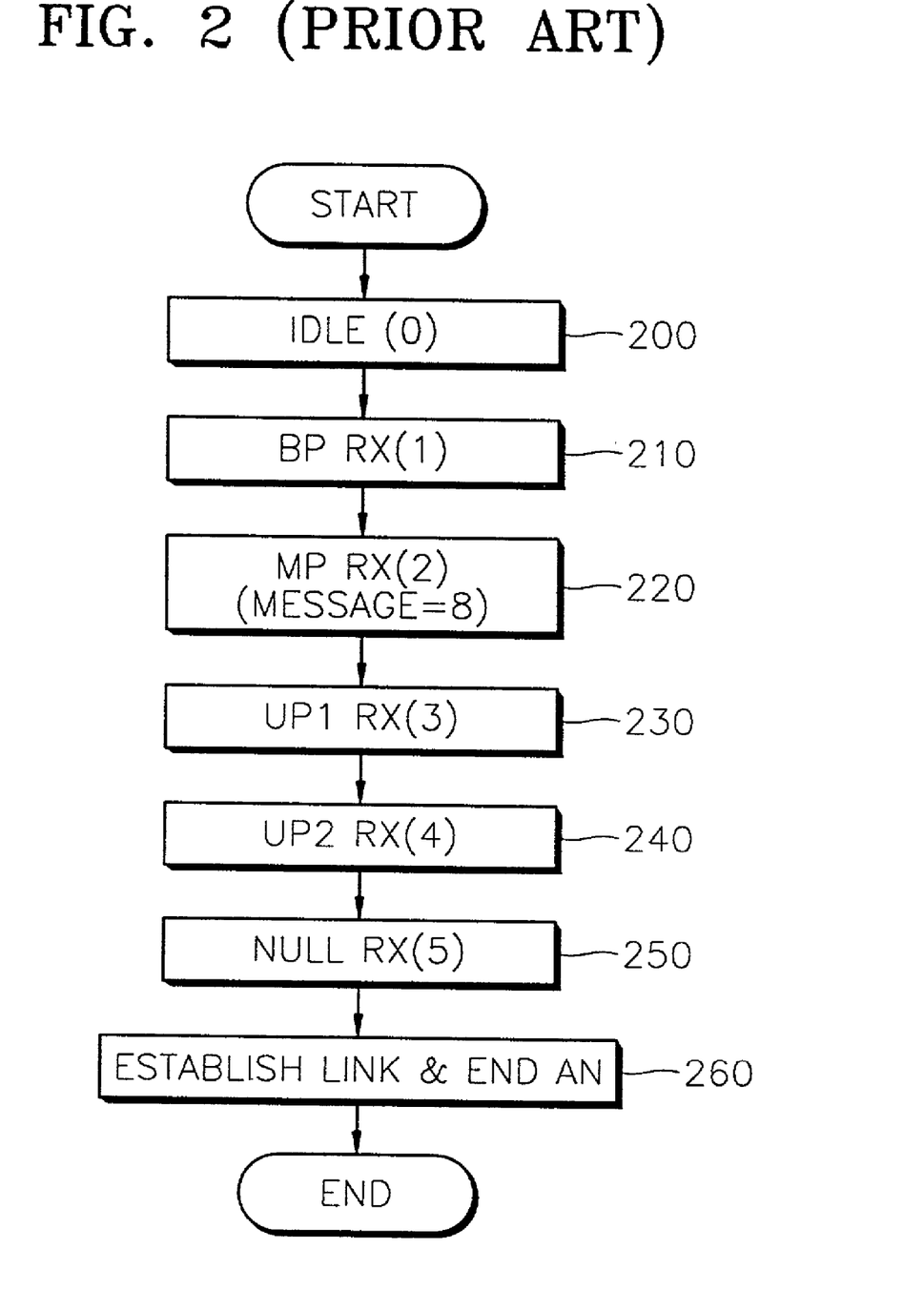
FIG. 2 is a flow diagram illustrating the receiving process of the conventional AN method in the high speed Ethernet using the 1000 Base-T standard.

FIG. 2 is a flow diagram illustrating the receiving process of the conventional AN method in high speed Ethernet using the 1000 Base-T standard. Referring to FIG. 2, as in the transmission steps, in the receiving steps (steps 210 through 260) which follow an idle step (step 200), a link is established and the AN ends (step 260) after five pages of information are received (steps 210 through 250). Also, the MP in the receiving steps shows the same integer "8" as that of the MP in the transmission steps.

As shown in FIGS. 1 and 2, under the current IEEE 802.3ab standard, the normal link is established between transmitting devices after the UP1, the UP2, and the NP are transmitted if transmission is possible at a speed of 1000 Mbps based on the analysis of transmitted and received MP. However, if the port types of the transmitting devices are different from each other, then the transmission mode and speed are determined only by the UP1. In other words, in the prior art, the AN is completed only when the UP2 is transmitted although the UP2 is not necessary. Thus, the time required for establishing an AN link can increase due to the transmission of the UP2.

SUMMARY OF THE INVENTION

To solve the above and other related problems of the prior art, there is provided an auto-negotiation (AN) method and apparatus for a high speed link in a gigabit Ethernet. Advantageously, the AN method and apparatus can increase the link speed during an AN function using a message page that indicates a specific state that is unused under the 1000 Base-T standard.

According to an aspect of the present invention, there is provided an auto-negotiation (AN) method for establishing a high speed link between a first transmitting device and a second transmitting device. A transmission state machine and a reception state machine of the first and the second transmitting devices are initialized. A base page that indicates a transmission capability is transmitted and received between the first and the second transmitting devices. A message page that indicates a 1000 Mbps transmission capability and a specific state is transmitted and received between the first and the second transmitting devices. A first unformatted page that indicates transmitting speeds, modes, and port types of the first and the second transmitting devices is transmitted and received. It is determined whether a master and a slave can be determined from among the first and the second transmitting devices based upon the first unformatted page. A null page is transmitted and received after the first unformatted page, when the master and the slave can be determined. The high speed link is established between the first and the second transmitting devices and the AN method is terminated, upon transmitting and receiving the null page.

According to another aspect of the present invention, there is provided an auto-negotiation (AN) apparatus for establishing a high speed link between a first transmitting device and a second transmitting device which transmit data. An arbiter, disposed in each of the first and the second transmitting devices, links the first and the second transmitting devices using page information transmitted between the first and the second transmitting devices. A state control unit has a transmission state machine and a reception state machine. The transmission state machine controls transmission states of page information transmitted via the arbiter for an AN function. The reception state machine controls a reception state of page information received from a transmitting device of a remote station. The state control unit controls a transmission and a receipt of a message page that indicates a specific state at a speed of 1000 Mbps. A master/slave (M/S) determiner determines a master and a slave from the page information transmitted between the first and the second transmitting devices. A register unit stores the page information transmitted and received between the first and the second transmitting devices. The page information comprises at least one of the base page, the message page, the first unformatted page, the second unformatted page, and the null page.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF PREFERRED EMBODIMENTS

Hereinafter, an auto-negotiation (AN) method for a high speed link in a gigabit Ethernet using the 1000 Base-T standard and an apparatus thereof according to the present invention will be described with reference to the attached drawings.

Figure 3:
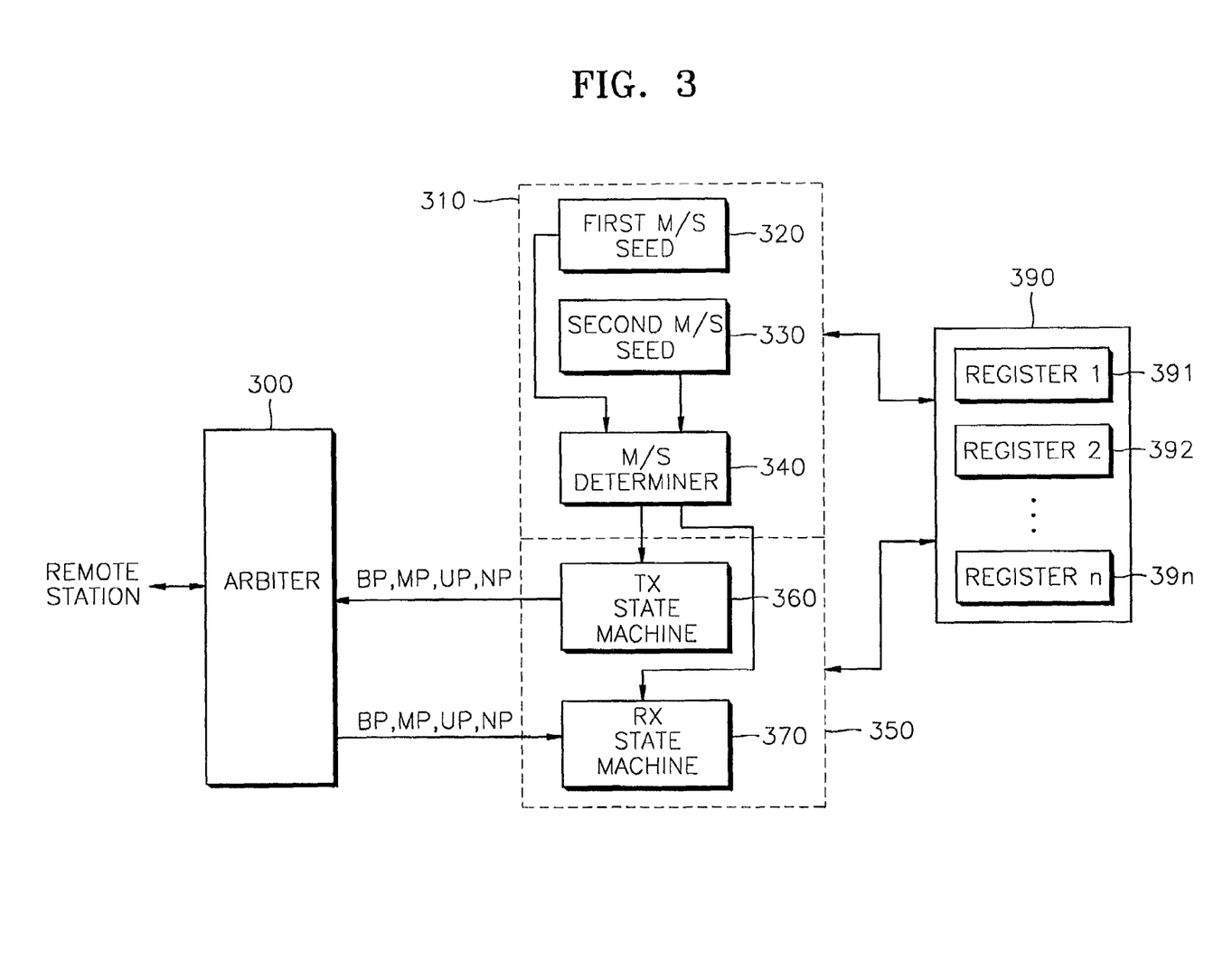
FIG. 3 is an apparatus for performing an AN method in a high speed Ethernet using the 1000 Base-T standard, according to an illustrative embodiment of the present invention.

FIG. 3 is a diagram illustrating an apparatus for performing an AN method for a high speed link in a gigabit Ethernet according to an illustrative embodiment of the present invention. The AN apparatus shown in FIG. 3, which is a physical layer chip provided in transmitting devices in the Ethernet, includes an arbiter 300, a master/slave (hereinafter, referred to as "M/S") determination unit 310, a state control unit 350, and a register unit 390.

The transmitting device having the AN apparatus shown in FIG. 3 may be a personal computer (hereinafter, referred to as "PC"), a hub switch that performs switching based on the speed of each PC or a backbone switch.

The arbiter 300 arbitrates line switching based on the transmission speed and mode with the transmitting device of a remote station. The arbiter 300 is installed in both local and remote transmitting devices and links the transmitting devices using page information transmitted and received there between. Also, the arbiter 300 carries out the AN function for the link between the transmitting devices in an Ethernet supporting 1000 Mbps speeds.

Figure 4:
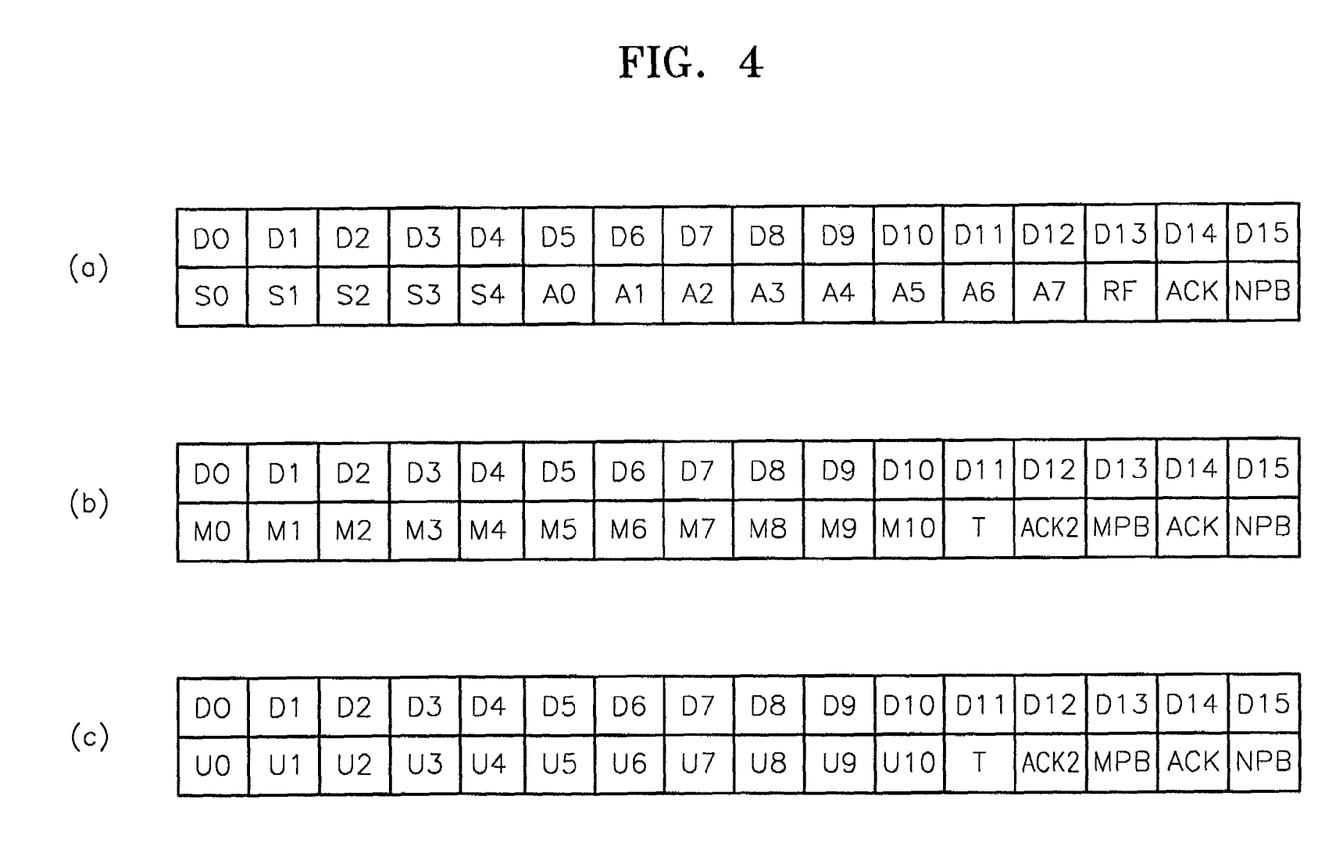
FIGS. 4A through 4C are diagrams illustrating page information transmitted and received for performing the AN function in the apparatus shown in FIG. 3, according to an illustrative embodiment of the present invention.

The register unit 390 stores page information transmitted from the transmitting device, i.e., a BP, an MP, UP1 and UP2 and page information received from the remote transmitting device. The register 390 comprises registers 391 through 39n and the page data are stored in corresponding registers 391 through 39n of the register unit 390. The page information is the fast link pulses (hereinafter referred to as "FLP") transmitted and received for the link between two transmitting devices capable of transmitting data at a speed of 1000 Mbps. That is, the page information means 16-bit data except a clock signal of the FLPs. The FLPs comprise a plurality of normal link pulses (hereinafter referred to as "NLPs") and means the transmitting ability of each device. Each page data will be described with reference to FIG. 4.

The M/S determination unit 310 determines whether the transmitting devices serve as a master or a slave. In other words, the M/S determination unit 310 determines the priority of the transmitting devices by the UP1 or UP2. To carry out this function, the M/S determination unit 310 includes a first master/slave (M/S) SEED 320, a second master/slave (M/S) SEED 330, and a master/slave (M/S) determiner 340. The first M/S SEED 320 stores random seed values to be transmitted to an outer transmitting device by the UP2. The second M/S SEED 330 stores random seed values received from the remote transmitting device. Here, the random seed values, which are arbitrary ones for determining the master and slave between devices, are transmitted and received by the UP2. The M/S determiner 340 determines the master and slave between the transmitting devices with random seed values which are transmitted and received by the UP1 or UP2. For example, in a case where two transmitting devices have the same port types, the M/S determiner 340 determines the master and slave by comparing a random seed value stored in the first M/S SEED 320 with a random seed value stored in the second M/S SEED 330. Also, in a case where two transmitting devices have different port types, the M/S determiner 340 determines the master/slave by the UP1.

The state control unit 350 includes a transmission (TX) state machine 360 for controlling the transmission state of page information which are transmitted via the arbiter 300 and required for the AN. The state control unit 350 also includes a receipt (RX) state machine 370 for controlling the receipt state of page information which are received from the remote transmitting device. In particular, the state control unit 350 controls the transmission and reception of an MP representing a specific state at a speed of 1000 Mbps. The page information includes a BP, an MP, a UP, and an NP. UP may include UP1 and UP2 or UP may be UP1 alone in the present invention. The TX state machine 360 transmits page information stored in the register unit 390 via the arbiter 300 to the remote transmitting device, and downloads page information to be transmitted from the register unit 390 and then transmits the downloaded page information. The RX state machine 370 receives page information via the arbiter 300 from the outside and stores the page information in the register unit 390. Here, the TX state machine 360 not only reads values set in the registers, i.e., data bits of corresponding page information but programs them so as to change the values based on system design methods.

FIGS. 4A through 4C are diagrams illustrating the compositions of page information which are transmitted and received by the AN method, according to an illustrative embodiment of the present invention. In particular, FIG. 4A illustrates a BP, FIG. 4B illustrates an MP, and FIG. 4C illustrates a UP1 and a UP2. Referring to FIG. 4A, the BP includes basic data on transmission speeds, e.g., transmission capability to transmit data at a speed of 10 Mbps/100 Mbps or 1000 Mbps. S0 through S4 included in D0 through D4 denote selector fields for selecting a protocol to be used. For example, a "00001" of the selector field means the use of the protocol under the IEEE 802.3 standard. A0 through A7 defines the data area which means the transmission capability of a device. In other words, A0 through A7 denote that data are transmitted and received between devices at a speed of 10 Mbps or 100 Mbps. D13 through D15 denote page state areas. In other words, the RF bit stored in D13 indicates errors occurring in a receiving device and Acknowledge (ACK) bit stored in D14 indicates the acknowledged results of the received data. Next page bit (NPB) in D15 indicates whether or not a next page to be transmitted exists and is used for determining the possibility of transmission at a speed of 1000 Mbps. For example, if a next page to be transmitted exists, then it is considered to be capable of being transmitted at 1000 Mbps.

Such next page is essential for transmission at a speed of 1000 Mbps and is effective when both transmitting devices have the transmission functions of a next page. Here, the next page, which includes a message page and an unformatted message page, denotes page information for transmitting additional data. Also, the next page is added to determine the M/S between transmitting devices in an Ethernet operating at a speed of 1000 Mbps.

With reference to FIG. 4B, the MP is comprised of an 11-bit message area, i.e., M0 through M10 stored in D0 through D10 and page state areas stored in D11 through D15. The MP is defined under the IEEE 802.3ab standard. The Message areas include information on transmission capabilities of the transmitting devices at a speed of 1000 Mbps and information on the later transmission of two unformatted message pages. D11 in FIG. 4B indicates the changing state of each bit datum in a corresponding page, i.e., TOGGLE state. D12 and D14 indicate the acknowledged results of the received messages. For example, ACK indicates the acknowledged result of the BP and ACK2 indicates the acknowledged result of a next page. MPB in D13 indicates whether the currently transmitted page is the MP. If MPB is "1", then the currently transmitted page is the MP; if MPB is "0", then the currently transmitted page is not the MP. The next page bit (NPB) in D15 is set to "1" if a next page to be transmitted exists; otherwise, the NPB is set to "0." In the present invention, a specific state is used from among the message areas of the MP that is not used in the IEEE 802.3ab standard Thus, links can be established between the transmission devices without the transmission of the UP2. More detailed states of the MP will be described with reference to FIG. 6.

Referring to FIG. 4C, the UP1 and UP2 are comprised of data areas stored in D0 through D10 (i.e., U0 through U10), and page state areas in D11 through D15. The data areas of the UP1 include the transmission speeds and modes of the transmitting devices, device types, and duplex transmission types. For example, the transmission speed means the possibility of transmission at 1000 Mbps and the transmission mode indicates a master or slave role. The device type denotes multi-port or single port. The duplex transmission type denotes half duplex transmission or full duplex transmission. Meanwhile, random seed values are stored in the data areas of the UP2. The page stage areas D11 through D15 of the UP1 and UP2 have the same data as the state areas of the MP.

Figure 5:
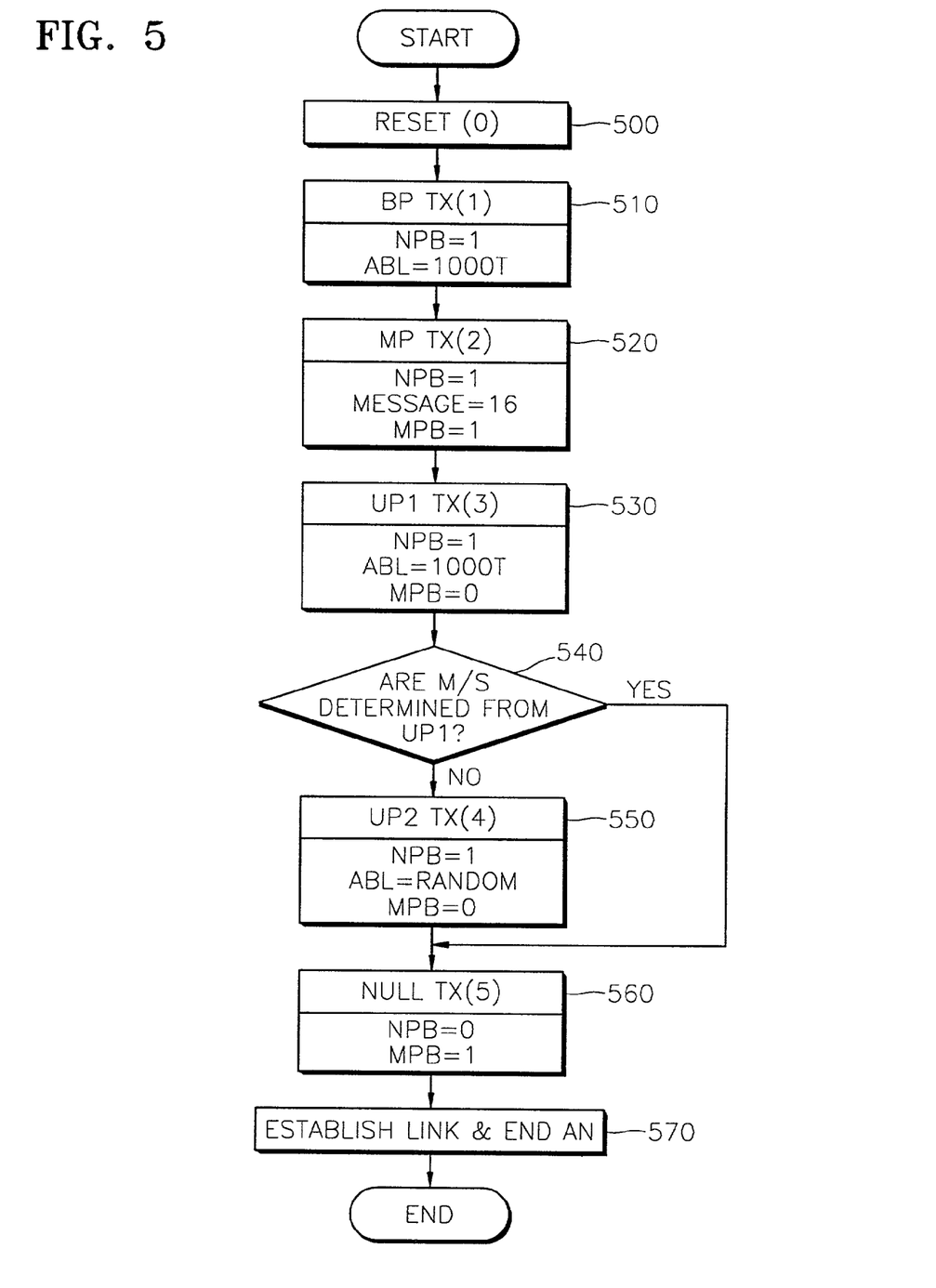
FIG. 5 is a flow diagram illustrating the transmission process of the AN method in the high speed Ethernet using the 1000 Base-T standard, according to an illustrative embodiment of the present invention.

FIG. 5 is a flow diagram illustrating the transmission process of the AN method for high speed linking in an Ethernet using the 1000 Base-T standard, according to an illustrative embodiment of the present invention. The steps shown in FIG. 5 are performed in the TX state machine 360 of FIG. 3. The AN method will be described with reference to the AN apparatus of FIG. 3. The TX state machine 360 is reset when the transmitting devices such as PCs or hub switches are supplied with power or when new links are established (step 500). In general, the AN function ends before the execution of an operating system (hereinafter referred to as "OS") when booting a PC. The TX state machine 360 transmits the BP of FIG. 4A to carry out the AN function (step 510, TX (1)) after the reset. Here, if the next page bit NPB of the BP is "1", then the transmission capability ABL is 1000 Mbps. However, if the next page bit NPB is "0" in the BP received from the remote transmitting device, then the TX state machine 360 determines the transmission capability of remote transmission device as 10 Mbps or 100 Mbps, not 1000 Mbps, and establishes the link with the remote station without further transmission of pages.

Figure 6:
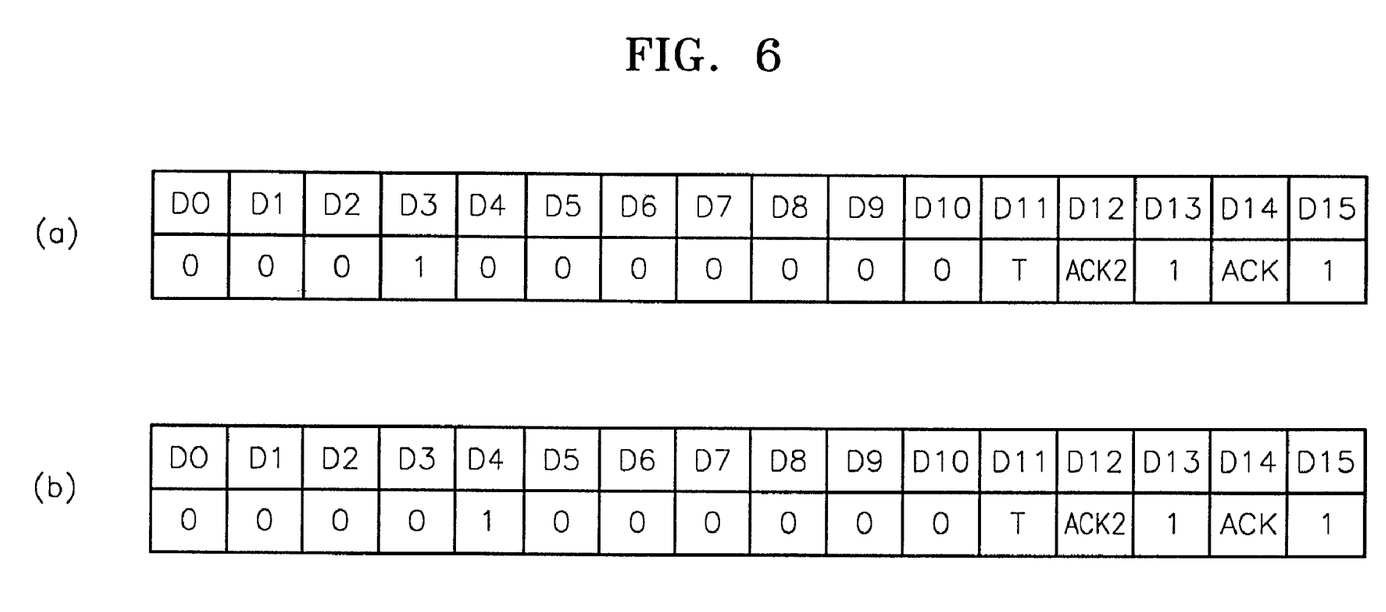
FIGS. 6A through 6B are diagrams illustrating message pages transmitted during the AN function, according to an illustrative embodiment of the present invention.

As previously described, if the TX state machine 360 transmits the BP of FIG. 4A and receives the BP, where the next page bit NPB is "1", from the remote station, the TX state machine 360 transmits the MP (step 520, TX (2)). In the present invention, the message areas M0 through M10 of the MP including messages in specific states are transmitted. A detailed example of this is shown in FIG. 6.

FIG. 6A shows a MP used in the IEEE 802.3ab standard and FIG. 6B shows a MP used in the present invention. Referring to FIG. 6A, message areas M0 through M10 denote an integer "8" and are expressed as a binary number 0000001000. Meanwhile, in the present invention, a state is used which was not used in the IEEE 802.3ab standard, i.e., a message for denoting an integer "16." Message areas M0 through M10 of FIG. 6B are expressed as a binary number 0000010000. Here, FIG. 6B shows the MP and thus the message page bit MPB of state areas is set to "1". The UP1 is due to be transmitted as a next page and thus the next page bit NPB of the MP is set to "1". If the MP received from the remote transmitting device shows "8", then the AN is performed by the same transmission process as that shown in FIG. 1.

If the MP representing the state of "16" is transmitted and received in step 520, then the TX state machine 360 transmits the UP1 (step 530, TX (3)). In other words, if an MP having the same message as the transmitted one is received, then the TX state machine 360 determines that the UP2 may not be transmitted after the UP1. Here, the next page bit NPB of the UP1 is set to "1" and the transmission capability ABL in data area shows the possibility of 1000 Mbps transmission. Also, the UP1 is not the MP and thus the message page bit MPB is set to "0". The M/S determiner 340 determines the M/S from the UP1s transmitted to and received from the remote station (step 540). If the M/S is determined, then the TX state machine 360 transmits the NP (step 560, TX (5)). Here, the M/S are determined based on the device types stored in the data area of the UP1s. If the port types of two transmitting devices are both multi-ports or single ports, then the M/S cannot be determined from the UP1s. Table 1 illustrates the standard for determining the M/S.

TABLE 1

| Local Type | Remote Type | Selected Local Mode | Selected Remote Mode | Page |
|---|---|---|---|---|
| Single Port | Multi-Port | Slave | Master | UP1 |
| Single Port | Manual-Master | Slave | Master | UP1 |
| Manual-Slave | Manual-Master | Slave | Master | UP1 |
| Manual-Slave | Multi-Port | Slave | Master | UP1 |
| Multi-Port | Manual-Master | Slave | Master | UP1 |
| Manual-Slave | Single-Port | Slave | Master | UP1 |
| Multi-Port | Single-Port | Master | Slave | UP1 |
| Multi-Port | Manual-Slave | Master | Slave | UP1 |
| Manual-Master | Manual-Slave | Master | Slave | UP1 |
| Manual-Master | Single-Port | Master | Slave | UP1 |
| Single-Port | Manual-Slave | Master | Slave | UP1 |
| Manual-Master | Multi-Port | Master | Slave | UP1 |
| Multi-Port | Multi-Port | Seed Value (UP2) | Seed Value (UP2) | UP2 |
| Single-Port | Single-Port | Seed Value (UP2) | Seed Value (UP2) | UP2 |
| Manual-Slave | Manual-Slave | Config Fault | Config Fault | |
| Manual-Master | Manual-Master | Config Fault | Config Fault | |

From Table 1, when the port of the local station is a single port and the port of the remote station is a multi-port, the transmitting mode of the local station is the slave and the transmitting mode of the remote station is the master. Also, if the port of the local station is a single port and the port of the remote station is a manual-master, then the local station is the slave and the remote station is the master. Here, the manual-master is a state that the transmitting device is preset to serve as an arbitrary master. As shown in Table 1, if the port types of the local and remote stations are different from each other, then the M/S can be determined from the UP1s. Other cases are shown in Table 1 and, thus, detailed descriptions thereof are omitted for purposes of brevity. However, if the ports of the local and remote stations are equal, e.g., if both are multi-ports or single-ports, the M/S cannot be determined from the UP1s. Also, if the ports of the local and remote stations are both manual-slaves or manual-masters, then it is considered that they have configuration faults. As a result, the AN cannot be made.

If the M/S are determined from the UP1s, then the M/S determiner 340 transmits the determined result to the TX and RX state machines 360 and 370 to inform the TX and RX state machines 360 and 370 that the next page to be transmitted is the NP, not the UP2. Thus, the TX state machine 360 transmits the NP, not the UP2, after the UP1 (step 560, TX (5)). In the case of the NP, there is no next page to be transmitted and thus the next page bit NPB is set to "0". The detailed configuration of the NP is not shown. However, the NP is the MP and thus the message page bit MPB is set to "1". Through these steps, a link is established between transmission devices and the AN ends (step 570).

Meanwhile, in step 540, if the M/S are not determined from the UP1, then the TX state machine 360 transmits the UP2 after the UP1 (step 550). Here, the random seed value of the transmitted UP2 is stored in the first M/S SEED 320. Also, the random seed value of the UP2 received from the remote station is stored in the second M/S 330. Thus, the M/S determiner 340 compares the random seed value stored in the first M/S 320 with the random seed value stored in the second M/S 330 and determines the device having the larger random seed value as the master. The device having the smaller random seed value serves as the slave. The UP2 has a next page to be transmitted. Thus, the next page bit NPB is set to "1", and the transmission capability ABL is determined by the random seed value and set to "RANDOM". Also, the UP is not the MP and thus the message page bit MPB is set to "0". The TX state machine 360 transmits the NP after the UP2 (step 560) and then establishes a link and ends the AN when it receives the NP from the remote station (step 570).

The TX state machine 360 normally transmits the UP1 and UP2 and carries out the AN when receiving the MP having a state of "8" from the remote station after transmitting the MP having a state of "16" to the remote station.

Figure 7:
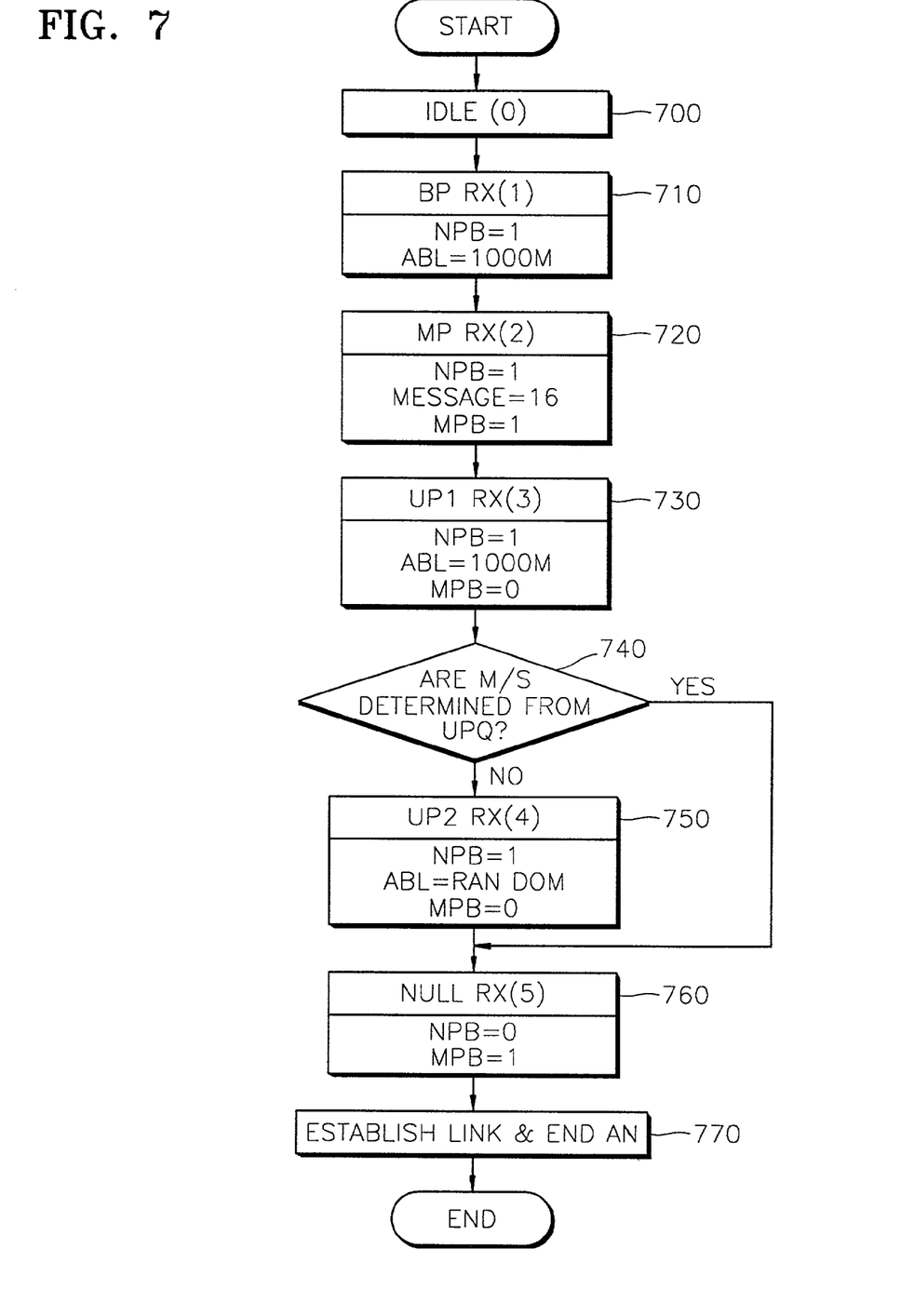
FIG. 7 is a flow diagram illustrating the receiving process of the AN method in the high speed Ethernet using the 1000 Base-T standard, according to an illustrative embodiment of the present invention.

FIG. 7 is a flow diagram illustrating the receiving process of the AN method for a high speed link in an Ethernet using the 1000 Base-T standard, according to an illustrative embodiment of the present invention. The receiving steps are carried out in the RX state machine 370 shown in FIG. 3. The RX machine 370 is in an IDLE state (step 700). The receiving steps are connected with the transmitting steps and thus they are comprised of almost similar steps. The RX state machine 370 receives the BP from the remote station (step 710, RX (1)). Next, the RX state machine 370 receives the MP having a state of "16" (step 720, RX (2)). Then, the RX state machine 370 senses that the UP2 may not be received. The RX state machine 370 receives the UP1 (step 730, RX (3)). The RX state machine 370 determines the M/S from the UP1 (step 740). If the M/S are determined, then the RX state machine 370 determines the next page to be received as the NP (step 760, (RX (5)) and establishes a link (step 770). In step 740, if the M/S are not determined from the UP1, then the RX state machine 370 normally receives the UP2 (step 750, (RX (4)) and then the NP (step 760). A link is established and the AN ends (step 770).

As described in FIGS. 5 and 7, an MP representing a specific state is used in the present invention and thus the time TX (4), RX (4) for transmitting a UP2 can be reduced during the AN function.

According to the present invention, a state not used in the IEEE 802.3ab standard (i.e., an MP having a message state of "16") is transmitted and received during an AN in the gigabit Ethernet. Thus, the time TX (4) and RX (4) for transmitting a UP2 can be reduced. Consequently, ⅛ of the total time required for transmitting each page during the AN can be reduced and the speed for establishing a link increased.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An auto-negotiation (AN) method for establishing a high speed link between a first transmitting device and a second transmitting device, comprising the steps of:

(a) initializing a transmission state machine and a reception state machine of the first and the second transmitting devices;

(b) transmitting and receiving a base page that indicates a transmission capability between the first and the second transmitting devices;

(c) transmitting and receiving a message page that indicates a 1000 Mbps transmission capability between the first and the second transmitting devices and a specific state;

(d) transmitting and receiving a first unformatted page that indicates transmitting speeds, modes, and port types of the first and the second transmitting devices;

(e) determining whether a master and a slave can be determined from among the first and the second transmitting devices based upon the first unformatted page;

(f) transmitting and receiving a null page after the first unformatted page, when the master and the slave can be determined; and (g) establishing the high speed link between the first and the second transmitting devices and ending the AN method, upon transmitting and receiving the null page, wherein in the step (e), the master and the slave can be determined when the port types of the first and the second transmitting devices are different from each other.

2. The AN method of claim 1, wherein the step (c) comprises the steps of:

(c1) transmitting the message page that indicates the 1000 Mbps transmission capability and the specific state from one of the first and the second transmitting devices;

(c2) determining whether the message page that indicates the specific state is received from an other one of the first and the second transmitting devices; and (c3) performing the steps (d) through (g) if a reception of the message page is determined.

3. The AN method of claim 1, further comprising the steps of:

(h) transmitting and receiving a second unformatted page after the first unformatted page via the first and the second transmitting devices, when the master and the slave cannot be determined in the step (e); and (i) establishing a link and ending the AN method by transmitting and receiving the null page, wherein the second unformatted page includes random seed values.

4. The AN method of claim 3, wherein the random seed values included in the second unformatted page of the first and the second transmitting devices are compared and whichever of the first and the second transmitting devices has a larger seed value is determined to be the master.

5. The AN method of claim 1, wherein the transmitting device receiving the message page that indicates the specific state identifies a page received after the first unformatted page as the null page.

6. An auto-negotiation (AN) method for establishing a high speed link between a first transmitting device and a second transmitting device, comprising the steps of:

(a) initializing a transmission state machine and a reception state machine of the first and the second transmitting devices;

(b) transmitting and receiving a base page that indicates a transmission capability between the first and the second transmitting devices;

(c) transmitting and receiving a message page that indicates a 1000 Mbps transmission capability between the first and the second transmitting devices and a specific state;

(d) transmitting and receiving a first unformatted page that indicates transmitting speeds, modes, and port types of the first and the second transmitting devices;

(e) determining whether a master and a slave can be determined from among the first and the second transmitting devices based upon the first unformatted page;

(f) transmitting and receiving a null page after the first unformatted page, when the master and the slave can be determined; and (g) establishing the high speed link between the first and the second transmitting devices and ending the AN method, upon transmitting and receiving the null page, wherein in the step (c), the message page that indicates the specific state includes a message that indicates an integer "16".

7. An auto-negotiation (AN) apparatus for establishing a high speed link between a first transmitting device and a second transmitting device which transmit data, comprising:

an arbiter, disposed in each of the first and the second transmitting devices, for linking the first and the second transmitting devices using page information transmitted between the first and the second transmitting devices;

a state control unit having a transmission state machine and a reception state machine, the transmission state machine for controlling transmission states of page information transmitted via the arbiter for an AN function and the reception state machine for controlling a reception state of page information received from a transmitting device of a remote station, the state control unit for controlling a transmission and a receipt of a message page that indicates a specific state at a speed of 1000 Mbps;

a master/slave (M/S) determiner for determining a master and a slave from the page information transmitted between the first and the second transmitting devices; and a register unit for storing the page information transmitted and received between the first and the second transmitting devices, wherein the page information comprises at least one of the base page, the message page, the first unformatted page, the second unformatted page, and the null page, wherein the transmission and reception state machines control the transmission and the receipt of the message page that indicates an integer "16" when transmitting data between the first and the second transmitting devices at the speed of 1000 Mbps.

8. The AN apparatus of claim 7, wherein the transmission and reception state machines control the transmission and the receipt of the first unformatted page and the null page after the message page.

9. The AN apparatus of claim 7, wherein the transmission and reception state machines control the sequential transmission and receipt of the first unformatted page, the second unformatted page, and the null page when the message page received from the first or the second transmitting device indicates a value other than "16".

10. The AN apparatus of claim 7, wherein the first and the second transmitting devices are one of personal computers, hub switches, and backbone switches.

11. An auto-negotiation (AN) method for establishing a high speed link between a first transmitting device and a second transmitting device, comprising the steps of:

transmitting and receiving a base page that indicates a transmission capability between the first and the second transmitting devices;

transmitting and receiving a message page that indicates a pre-assigned transmission capability between the first and the second transmitting devices and a specific state;

transmitting and receiving a first unformatted page that indicates transmission related information for the first and the second transmitting devices;

transmitting and receiving a null page after the first unformatted page, upon determining that a master and a slave can be determined from among the first and the second transmitting devices based upon the first unformatted page; and establishing the high speed link between the first and the second transmitting devices and ending the AN method, upon transmitting and receiving the null page, wherein the master and the slave can be determined when the first and the second transmitting devices have different port types.

12. The AN method of claim 11, wherein the step of transmitting and receiving the message page comprises the steps of:

transmitting the message page from one of the first and the second transmitting devices;

determining whether the message page is received from an other one of the first and the second transmitting devices; and performing the steps of transmitting and receiving the first unformatted page, transmitting and receiving the null page, and establishing the high speed link and ending the AN method, when the message page is determined to be received.

13. The AN method of claim 11, further comprising the steps of:

transmitting and receiving a second unformatted page after the first unformatted page via the first and the second transmitting devices when the master and the slave cannot be determined; and establishing a link and ending the AN method by transmitting and receiving the null page, wherein the second unformatted page includes random seed values.

14. The AN method of claim 13, wherein the random seed values included in the second unformatted page of the first and the second transmitting devices are compared and whichever of the first and the second transmitting devices has a larger seed value is determined to be the master.

15. The AN method of claim 11, further comprising the step of identifying a page received after the first unformatted page as the null page, by whichever of the first and the second transmitting devices that receives the message page.

16. The AN method of claim 11, wherein the pre-assigned transmission capability is about 1000 Mbps.

17. An auto-negotiation (AN) method for establishing a high speed link between a first transmitting device and a second transmitting device, comprising the steps of:

transmitting and receiving a base page that indicates a transmission capability between the first and the second transmitting devices;

transmitting and receiving a message page that indicates a pre-assigned transmission capability between the first and the second transmitting devices and a specific state;

transmitting and receiving a first unformatted page that indicates transmission related information for the first and the second transmitting devices;

transmitting and receiving a null page after the first unformatted page, upon determining that a master and a slave can be determined from among the first and the second transmitting devices based upon the first unformatted page; and establishing the high speed link between the first and the second transmitting devices and ending the AN method, upon transmitting and receiving the null page, wherein the specific state indicated in the message page is an integer "16".

* * * * *